(12) United States Patent
Takatori et al.

(10) Patent No.: US 9,172,498 B2
(45) Date of Patent: Oct. 27, 2015

(54) CONTROLLED NOISE INJECTION IN TRANSMITTER FOR NOISE MARGIN TESTING

(71) Applicant: Futurewei Technologies, Inc., Plano, TX (US)

(72) Inventors: Hiroshi Takatori, Sacramento, CA (US); Kofi Anim-Appiah, Morgan Hill, CA (US); Hang Yan, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/852,643

(22) Filed: Mar. 28, 2013

(65) Prior Publication Data

US 2013/0259155 A1 Oct. 3, 2013

Related U.S. Application Data

(60) Provisional application No. 61/780,796, filed on Mar. 13, 2013, provisional application No. 61/616,741, filed on Mar. 28, 2012.

(51) Int. Cl.
*H04K 1/02* (2006.01)
*H04L 1/00* (2006.01)
(Continued)

(52) U.S. Cl.
CPC ............... *H04L 1/0042* (2013.01); *H04L 1/205* (2013.01); *H04L 1/24* (2013.01); *H04L 1/242* (2013.01); *H04L 25/03343* (2013.01)

(58) Field of Classification Search
CPC .......................... G10L 19/018; H04B 7/15585

USPC ........... 375/296, 295, 130, 261; 370/497, 529
See application file for complete search history.

(56) References Cited

U.S. PATENT DOCUMENTS 4,384,354 A * 5/1983 Crawford et al. ............. 375/227
5,525,984 A * 6/1996 Bunker ......................... 341/131
(Continued)

FOREIGN PATENT DOCUMENTS

WO 2005109666 A2 11/2005
WO 2008014129 * 1/2008
WO 2008014129 A2 1/2008

OTHER PUBLICATIONS

Foreign Communication From a Counterpart Application, PCT Application PCT/US2013/034377, Invitation to Pay Additional Fees dated on Jun. 25, 2013, 6 pages.
(Continued)

*Primary Examiner* — Leila Malek
(74) *Attorney, Agent, or Firm* — Conley Rose, P.C.; Grant Rodolph; William H. Dietrich (57) ABSTRACT

A transmitter comprising a noise signal generator, a summing element configured to generate a signal as a sum of an output of the noise signal generator and a transmit data signal, and a transmit driver configured to generate an output signal based on the sum. Also, a method of calibrating a signal-to-noise ratio (SNR) for a transmitter comprising transmitting a first signal comprising a data signal with no noise signal, capturing the first signal, transmitting a second signal comprising a noise signal, wherein both an amplitude and a phase of the noise signal have been adjusted by a gain and phase control element, capturing the second signal, and determining the SNR corresponding to the captured first signal and the captured second signal, wherein the transmitter transmits the second signal using a transmit driver.

4 Claims, 7 Drawing Sheets

(51) Int. Cl.
*H04L 1/20* (2006.01)
*H04L 1/24* (2006.01)
*H04L 25/03* (2006.01)

(56) References Cited

U.S. PATENT DOCUMENTS

| | | | |
|---|---|---|---|
| 5,694,421 A | 12/1997 | Park | |
| 6,885,209 B2* | 4/2005 | Mak et al. | 324/750.3 |
| 2003/0058924 A1* | 3/2003 | Darby et al. | 375/135 |
| 2004/0252802 A1* | 12/2004 | Yamaguchi | 375/371 |
| 2006/0001779 A1* | 1/2006 | Favrat et al. | 348/725 |
| 2006/0034358 A1 | 2/2006 | Okamura | |
| 2006/0153572 A1* | 7/2006 | Champion et al. | 398/140 |
| 2007/0152865 A1* | 7/2007 | Melanson | 341/155 |
| 2008/0010474 A1* | 1/2008 | Chapuis | 713/300 |
| 2008/0012990 A1* | 1/2008 | Kitamura et al. | 348/607 |
| 2008/0260042 A1* | 10/2008 | Shah et al. | 375/240.25 |
| 2009/0304054 A1* | 12/2009 | Tonietto et al. | 375/221 |
| 2011/0037447 A1* | 2/2011 | Mair | 323/282 |
| 2011/0262129 A1* | 10/2011 | Shaffer et al. | 398/5 |
| 2012/0072784 A1* | 3/2012 | Li et al. | 714/704 |
| 2012/0236757 A1 | 9/2012 | Klein | |
| 2012/0236939 A1* | 9/2012 | Filippini et al. | 375/240.14 |

OTHER PUBLICATIONS

Foreign Communication From a Counterpart Application, PCT Application PCT/US2013/034377, International Search Report dated Aug. 5, 2013, 7 pages.

Foreign Communication From a Counterpart Application, PCT Application PCT/US2013/034377, Written Opinion dated Aug. 5, 2013, 10 pages.

IEEE Std. 802.3ab-1999, "Supplement to Carrier Sense Multiple Access with Collision Detection (CSMA/CD) Access Method and Physical Layer Specifications," —"Physical Layer Parameters and Specifications for 1000 Mb/s Operation Over 4-Pair of Category 5 Balanced Cooper Cabling, Type 1000BASE-T," 140 pages.

Office Action dated Aug. 27, 2015, U.S. Appl. No. 14/722,511, filed May 27, 2015, 20 pages.

* cited by examiner

CONTROLLED NOISE INJECTION IN TRANSMITTER FOR NOISE MARGIN TESTING

CROSS-REFERENCE TO RELATED APPLICATIONS

The present application claims priority to U.S. Provisional Patent Application No. 61/616,741 filed Mar. 28, 2012 by Hiroshi Takatori et al. and entitled "Noise Injection Method" and to U.S. Provisional Patent Application No. 61/780,796 filed Mar. 13, 2013 by Hiroshi Takatori, et al. and entitled "Transmitter Noise Injection", which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Bit Error Ratio (BER) is a metric used to evaluate transmission system quality in communications equipment. Communications equipment may be manufactured with a target BER, referring to the BER under the worst-case noise conditions. Since it is desirable for equipment to be manufactured with a noise margin, which is the additional noise required beyond a nominal noise power level to reach the target BER, it is desirable for equipment to be tested in noise conditions that have noise greater than that in the worst-case operating noise environment.

In conventional controlled tests of communications equipment, a data signal is transmitted from a piece of communications equipment and a noise signal may be added to the data signal prior to reception to generate a noisy signal. The noisy signal may be received and the BER measured. The process of adding the noise signal in such a scenario may change the channel seen by the data signal relative to what the equipment would experience in the field. For relatively low speed data, the changes to the channel caused by controlled tests have a negligible effect on the BER as compared with the additive noise.

However, it may not be practical to measure the effects of additive noise in very high speed systems, e.g., systems faster than several gigabits per second (Gbps), and thus, the test scenario described above for testing noise margin has not been popular in the industry for very high speed systems. This is mainly because any noise injection circuitry itself causes additional impairments to the channel such as increasing loss, reflections, and uncontrolled crosstalk and Electromagnetic Interference (EMI). The BER due to these impairments may be significant relative to the BER due to additive noise. Also, an accurate noise margin test is difficult because any added noise level is not easy to control. And finally, there may be no physical space available for auxiliary devices for controlled noise generation once equipment is built for high-density backplanes. Despite these difficulties, there have been noise tolerance tests conducted in laboratories on specially built test boards, but significant differences between the noise environments of the test boards in a lab and the actual deployed systems in the field have rendered the results from such lab testing ineffective for use in accurate product qualifications. Therefore, there is a need for efficient and accurate noise margin tests for systems with data rates over several Gbps.

SUMMARY

In one embodiment, the disclosure includes a transmitter comprising a noise signal generator, and a transmit driver coupled to an output of the noise signal generator.

In another embodiment, the disclosure includes a method of transmitting a signal from a transmit driver, the method comprising receiving a signal comprising a noise signal at the transmit driver, and generating an output from the transmit driver based on the signal.

In yet another embodiment, the disclosure includes a method of calibrating signal-to-noise ratio (SNR) for a transmitter comprising transmitting a data signal with a noise signal switched off, capturing the transmitted data signal, transmitting the noise signal with the data signal switched off, capturing the transmitted noise signal, and determining the SNR corresponding to the transmitted data signal and the transmitted noise signal, wherein the transmitter transmits the noise signal by passing a noise signal through a transmit driver.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatuses for performing noise margin tests in high-speed communication systems. Architectures are proposed in which a noise source is embedded within a transmitter in a communication device to enable testing of the communication device. The addition of a noise source according to the embodiments presented herein may have the following advantages. First, the noise source has little to no effect on the communication channel itself. Therefore, little to no additional unwanted system degradations occur when noise is injected. Second, the noise source provides for system margin measurements in a deployed system using, e.g., BER measurements. Finally, the architectures provide the ability to control, detect, and characterize noise levels.

Figure 1:
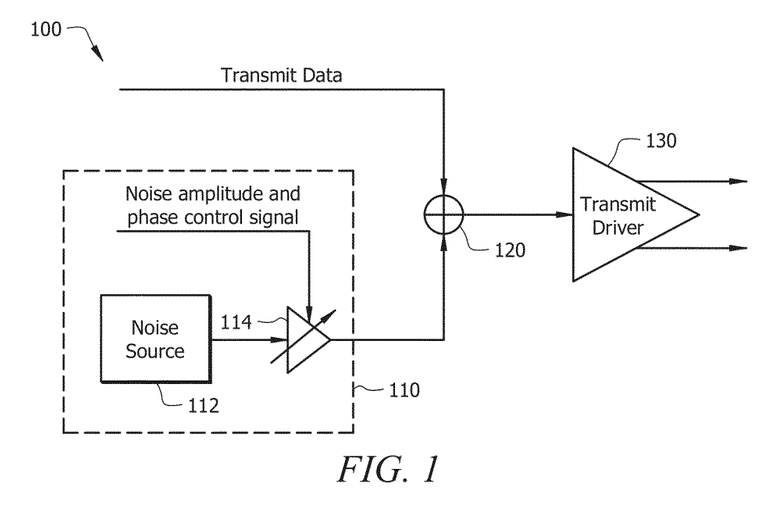
FIG. 1 is a schematic diagram of an embodiment of a transmitter.

FIG. 1 is a schematic diagram of an embodiment of a transmitter 100. The transmitter comprises a noise signal generator 110, a summing element or summing device 120 and a transmit driver 130 configured as shown in FIG. 1. As shown in FIG. 1, a signal from the noise signal generator 110 may be added to a transmit data signal using the summing element 120. The transmit data signal may be generated by the communication device 100 using a modulator (not shown). The transmit data signal may be any signal carrying digital data, including pulse amplitude modulated (PAM) signals, discrete multi-tone (DMT) modulated signals, or any other form of digital modulation known to a person having ordinary skill in the art.

The summing element 120 may be an analog summing element 120 configured to add analog inputs to produce an analog output. The output from the summing element 120 is provided to the transmit driver 130. The transmit driver 130 may generate a differential signal to be transmitted over a twisted-pair copper line. That is, the transmit driver 130 may be directly connected to a transmission channel (such as a twisted-pair copper line, coaxial cable, circuit-board traces, optical cables, or a wireless channel). The differential signal is illustrated as two outputs from the transmit driver 130. Although illustrated as a differential signal, the embodiments disclosed herein apply equally to transmit drivers that generate a single-ended output. Further, as shown in FIG. 1, the transmit driver 130 is a baseband transmit driver, but the embodiments herein apply also if the transmit driver 130 is a passband driver. The transmit driver 130 is a component well-known to a person of ordinary skill in the art. The transmit driver 130 may perform, for example, amplification, filtering, digital-to-analog conversion, frequency translation (passband generation), and/or impedance matching.

The noise signal generator 110 may be used to allow for testing of the communication systems employing the transmitter 100. In situations in which the transmitter 100 is not being tested, i.e., situations in which the transmitter 100 communicates data, the noise signal generator 110 may be turned off or switched off. In situations in which it is desired to test the transmitter 100, the noise signal generator 110 may be turned on. The noise signal generator 110 comprises a noise source 112 and a gain and phase control element 114. The gain and phase control element 114 controls the amplitude and phase of the signal generated by the noise source 112. The noise source may be a random pattern generator or any other type of noise source known to a person of ordinary skill in the art. The gain and phase control element 114 may receive a noise amplitude and phase control signal that sets the gain and phase of the control element 114. That is, the gain and phase of the element 114 may be adjustable or programmable. The noise amplitude and phase control signal may be generated by hardware, such as a processor, or a combination of hardware and software (not shown). Phase control may refer to controlling a time shift of the signal generated by the noise source 112 relative to the transmit data signal. The noise amplitude and phase control signal may be enabled to set a gain and delay of the gain and phase control element 114 for a particular transmission scenario, and then the noise amplitude and phase control signal may be turned off or disabled for a transmission so that the gain and phase of the gain and phase control element 114 may be fixed for the transmission.

Figure 2:
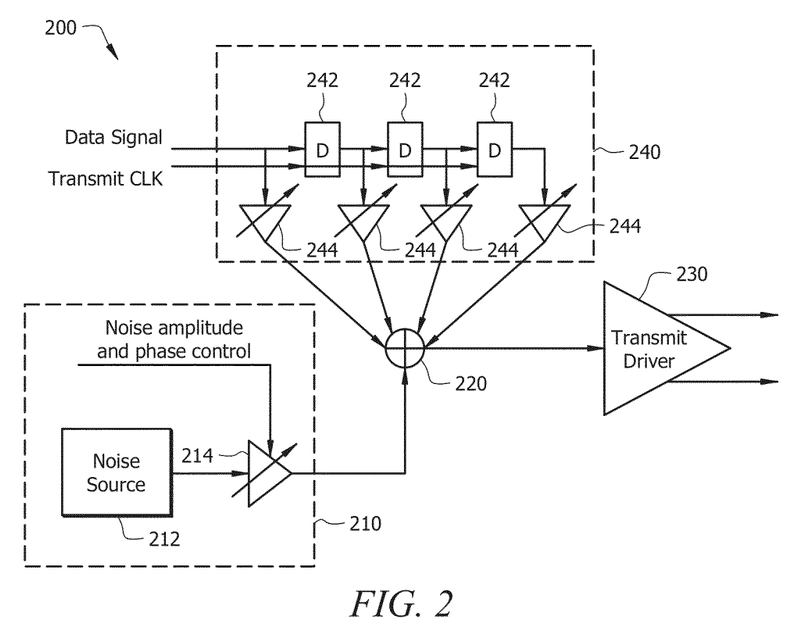
FIG. 2 is schematic of another embodiment of a transmitter.

FIG. 2 is a schematic of another embodiment of a transmitter 200. The transmitter 200 comprises a noise signal generator 210, a summing element 220, a transmit driver 230, and a finite-impulse response (FIR) filter 240 configured as shown in FIG. 2. The noise signal generator 210 and the transmit driver 230 may be the same as the noise signal generator 110 and the transmit driver 130, respectively, from FIG. 1, so it is not necessary to describe these elements further. The sum of the outputs from the FIR filter 240 at summing element 220 may be considered to be the transmit data signal. The FIR filter 240 comprises delay elements 242 and gains 244 as shown. The FIR filter may perform feedforward equalization according to principles known to a person having ordinary skill in the art. Although three delay elements 242 and four gains 244 are used for purposes of illustration, any number of delay elements 242 and gains 244 may be used. Each delay element 242 is configured to receive a transmit clock (CLK) signal and to delay the data signal by one clock cycle. As shown in FIG. 1, four versions of the data signal may be summed in summing element 220 to produce the transmit data signal. Further, a noise signal from noise signal generator 210 may be added to the FIR filter 240 outputs using the summing element 220. The summing element 220 may be configured to receive analog inputs and produce an analog output. A FIR filter, such as FIR filter 240, may be common in high-speed communication systems to compensate for channel distortion. The noise signal generator 210 may be turned on during testing of a communication system comprising the transmitter 200. The noise signal generator 210 may be turned off in situations in which the transmitter 200 communicates data.

Figure 3:
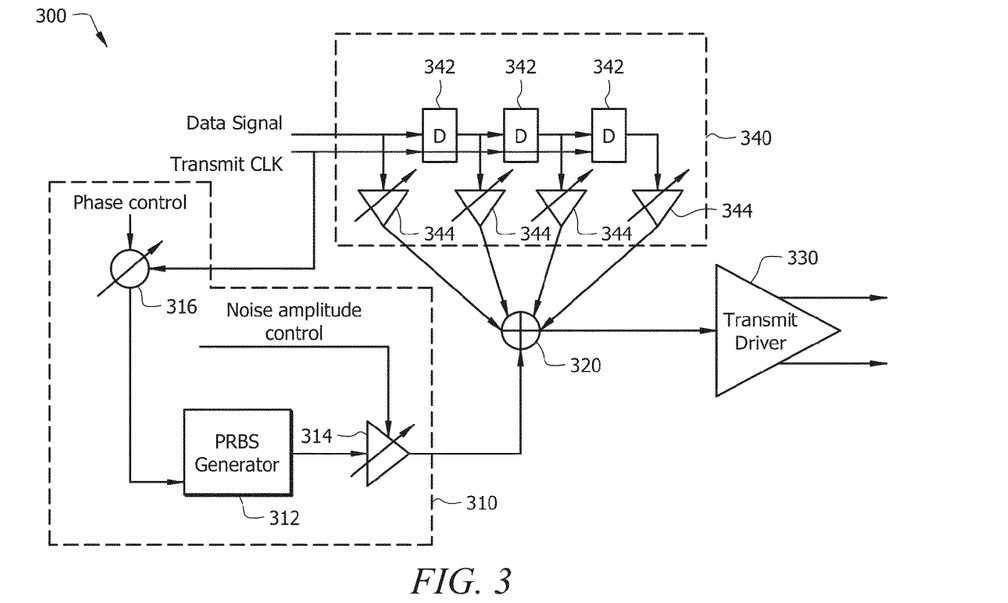
FIG. 3 is a schematic diagram of another embodiment of a transmitter.

FIG. 3 is a schematic diagram of another embodiment of a transmitter 300. The transmitter comprises a noise signal generator 310, a summing element 320, a transmit driver 330, and a FIR filter 340 configured as shown in FIG. 3. The FIR filter 340 may be the same as the FIR filter 240 in FIG. 2 and so is not described further here for brevity. The noise signal generator 310 comprises a pseudo-random binary sequence (PRBS) generator 312, a gain control element 314, and a phase control element 316 configured as shown in FIG. 3. The PRBS generator 312 generates a pseudo-random binary sequence pattern. The PRBS generator 312 is an example of a conventional noise source that is straightforward to implement. The phase control element 316 controls a time shift of the transmit CLK. As shown, the PRBS generator 312 may be clocked with the same clock fed to the FIR filter 340. The control of the time shift is according to the phase control signal input to the phase control element 316. The phase control signal may be generated by hardware, such as a processor, or by a combination of hardware and software (not shown). The gain control element 314 may control the gain of the output of the PRBS generator 312. In situations in which the transmitter 300 is not being tested, i.e., situations in which the transmitter 300 communicates data, the noise signal generator 310 may be turned off. In situations in which it is desired to test the transmitter 300, the noise signal generator 310 may be turned on.

Figure 4:
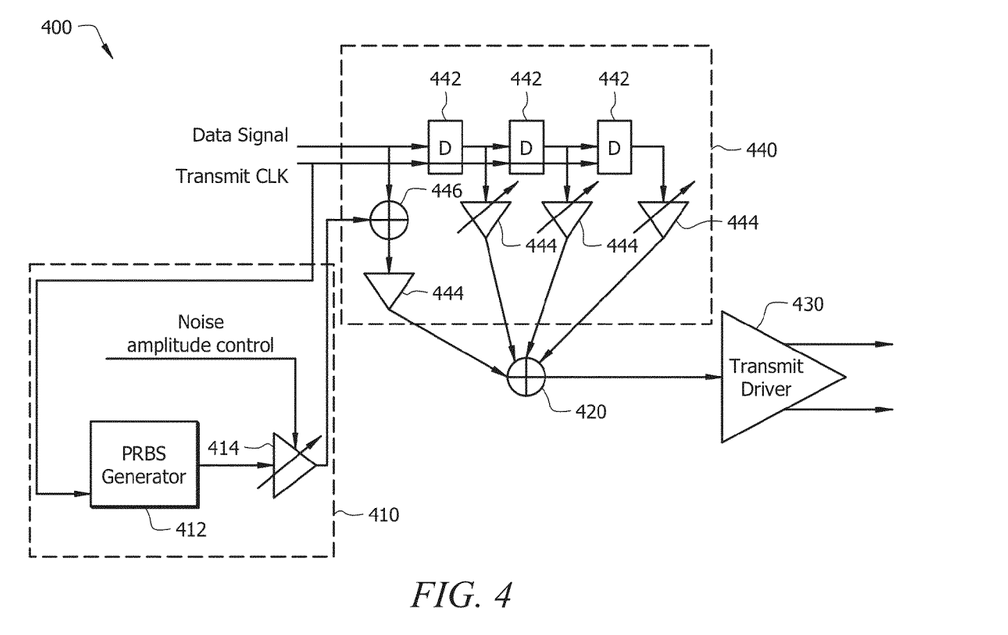
FIG. 4 is a schematic diagram of another embodiment of a transmitter.

FIG. 4 is a schematic diagram of another embodiment of a transmitter 400. The transmitter 400 comprises a noise signal generator 410, a summing element 420, a transmit driver 430, and a FIR filter 440 configured as shown in FIG. 4. The noise signal generator 410 comprises a PRBS generator 412 and a gain control element 414 (e.g., variable or programmable gain). The phase of the PRBS generator 412 may be controlled by the transmit CLK. The PRBS generator 412 may be synchronized with the transmit CLK. The FIR filter 440 comprises delay elements 442 and gains 444. The FIR filter 440 further comprises a summing element 446 configured to receive the transmit data signal and the output of the noise signal generator 410 as inputs and to add these two signals together to produce an output that is fed to the summing element 420. Noise injection is performed in transmitter 400 using digital/logic operations rather than using analog summing circuitry or devices. The summation at summing element 446 is done on discrete-time symbols (it takes place once per baud duration.) It is also possible to implement parts of this embodiment (and the previous embodiments in FIGS. 2-4) in continuous time using analog circuitry—specifically the FIR structure of blocks 440 and 420 (FIG. 4), blocks 240 and 220 (FIG. 2), and blocks 340 and 320 (FIG. 3). For the continuous-time implementation, block 214 (FIG. 2), block 314 (FIG. 3), and block 414 (FIG. 4) would include a digital-to-analog converter.

Figure 5:
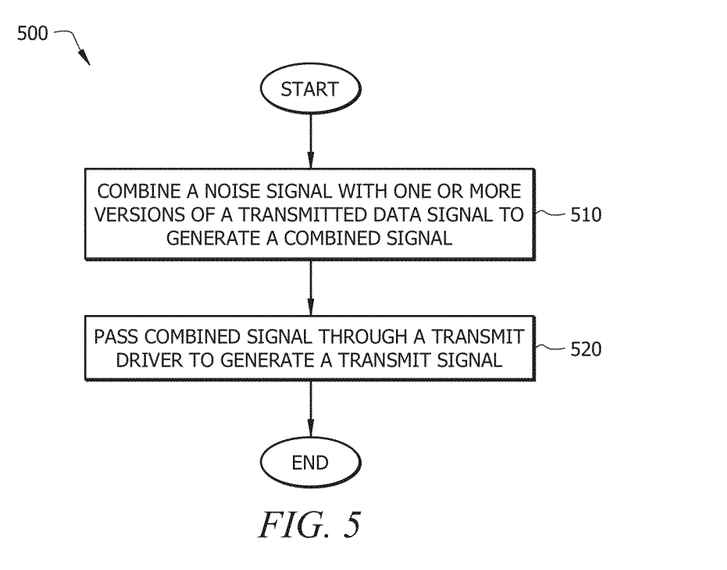
FIG. 5 is a flowchart of an embodiment of a method for injecting a noise signal into a transmitted signal.

FIG. 5 is a flowchart 500 of an embodiment of a method for injecting a noise signal into a transmitted signal. The flowchart 500 begins in block 510. In block 510, a noise signal may be combined with one or more versions of a transmit data signal to generate a signal that may be referred to as a combined signal. The noise signal may be generated using noise signal generators 110, 210, 310, or 410. The noise signal may be combined with one or more versions of a transmit data signal according to the transmitter structures 100, 200, 300, or 400 shown in FIGS. 1-4, respectively. The pre-amp signal may be passed through a transmit driver, such as transmit drivers 130, 230, 330, or 430, to generate a transmit signal. In block 520, the combined signal may be passed through a transmit driver, such as transmit driver 130, 230, 330, or 430, to generate a transmit signal.

Figure 6:
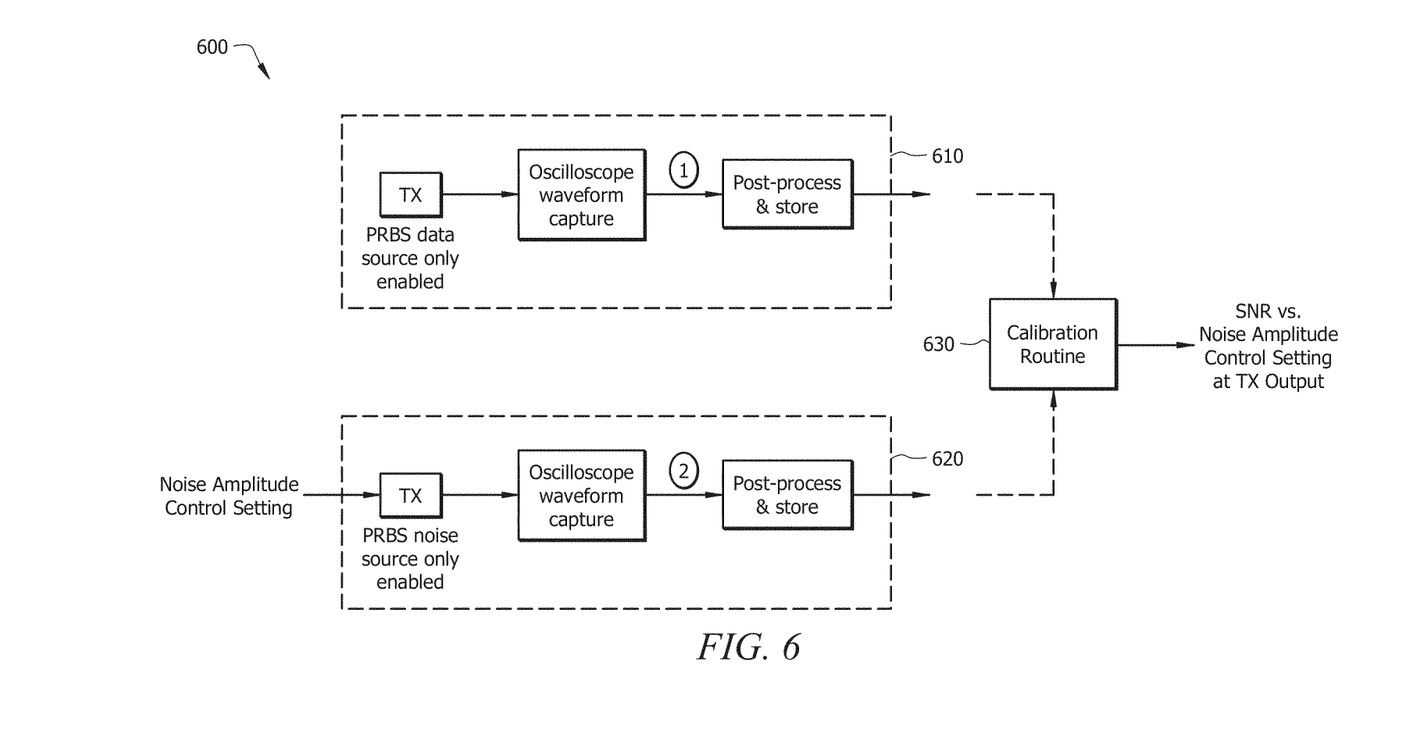
FIG. 6 illustrates an embodiment of a routine for detection and characterization of noise amplitude and output SNR for a transmitter.

FIG. 6 illustrates an embodiment 600 of a routine for detection and characterization of noise amplitude and output signal-to-noise ratio (SNR) for a transmitter. The routine may be performed using a transmitter, such as transmitter 100, 200, 300, or 400, that has a built-in noise source. In a first stage 610, a pseudo random sequence (e.g., PRBS7, a pseudo random binary sequence of length $2^7-1$) is transmitted, first with the noise source, such as noise source 110, 210, 310, or 410, disabled, and the sequence is captured with an oscilloscope. This procedure is repeated in stage 620 but for the noise source only (this time with data source disabled) at all the noise-control settings. In a third stage 630, post-processing software is then used to compute the SNR at the transmitter output for each noise-control setting. This procedure performs a block-level calibration of a transmitter that corrects for imperfections in the realization of the signal and noise signal paths through the transmitter.

Note that it is also possible to perform the calibration using a somewhat different routine:
(1) Perform a waveform capture with the data source only.
(2) Perform a waveform capture with both the data and noise sources enabled.
(3) Repeat (2) for all values of the noise control setting.
(4) Process this data to compute the transmitter-output SNR.
Again, there are a number of ways to process this data to determine SNR using straightforward calculations.

Figure 7A:
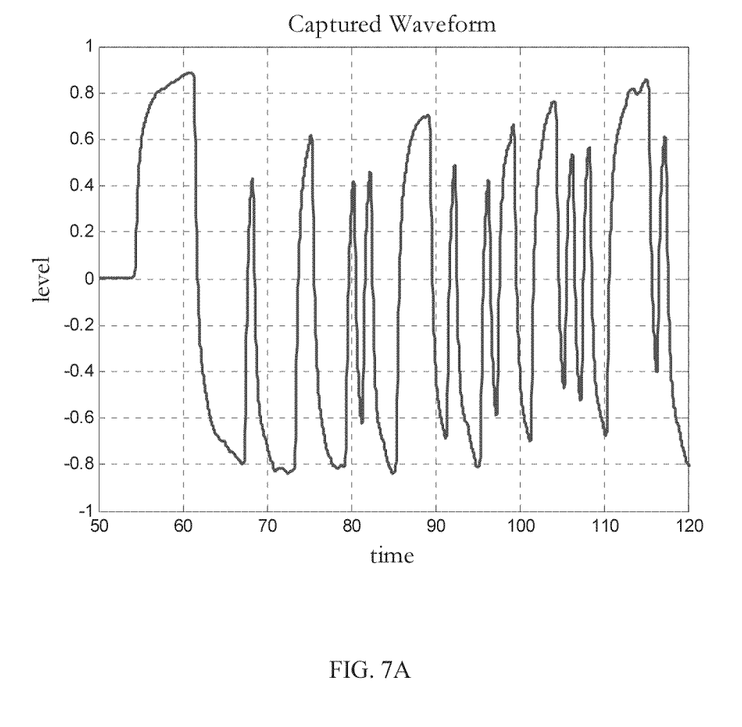
FIG. 7A shows an example of a captured waveform for a pseudo-random binary sequence (PRBS) data source.
Figure 7B:
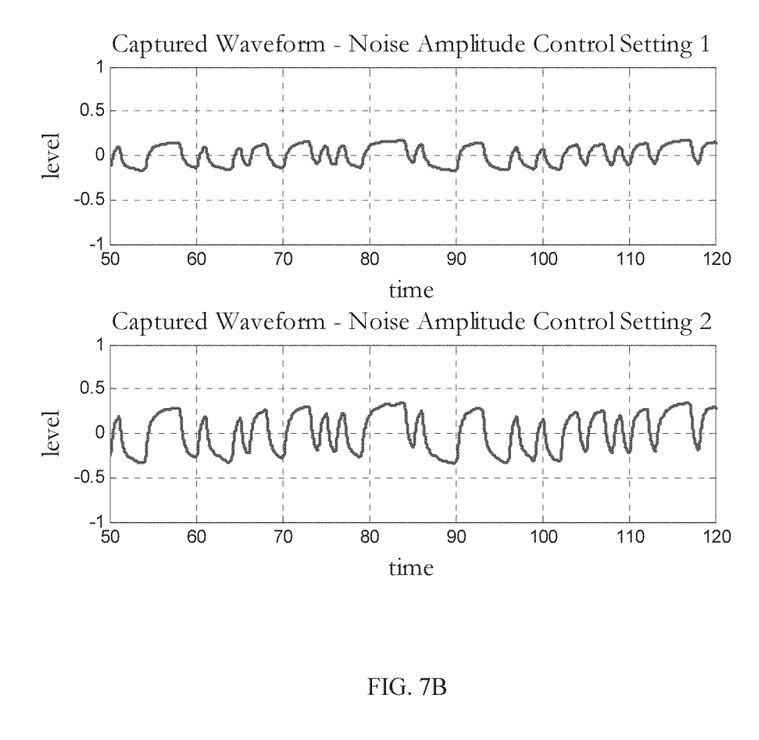
FIG. 7B shows examples of captured waveforms for two settings of a noise amplitude control.

FIG. 7A shows an example of a captured waveform for a PRBS data source. That is, a data signal was generated using a PRBS source and transmitted from a transmitter, such as transmitter 100, with a noise signal generator, turned off. FIG. 7B shows examples of captured waveforms for two settings of a noise amplitude control. That is, an adjustable gain element has two setting in a noise signal generator used for these result, and a noise signal was transmitted and captured with no data signal present for each of the two settings. There are a number of ways to compute the SNR from the captured data using straightforward calculations.

Figure 8:
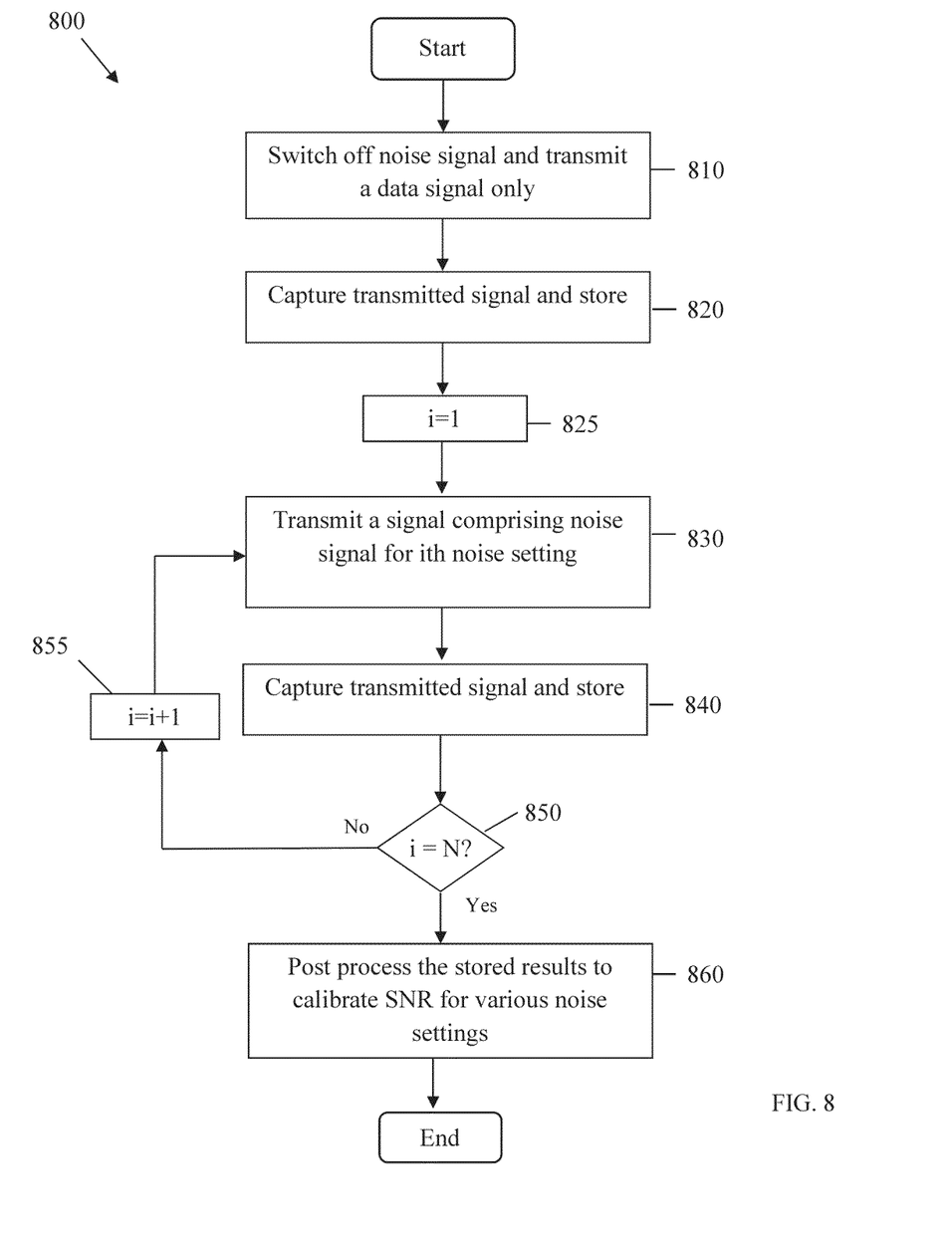
FIG. 8 is a flowchart of an embodiment of a method for calibrating a transmitter for SNR.

FIG. 8 is a flowchart 800 of an embodiment of a method for calibrating a transmitter for SNR. The flowchart 800 begins in block 810. In block 810, a noise signal generator, such as noise signal generator 110, 210, 310, or 410, may be switched off and a data signal may be transmitted. The data signal may be the output of summing element 120, 220, 320, or 420 when the noise signal generator, 110, 220, 320, or 420, respectively, is switched off. In block 820, the transmitted signal is captured, for example, by an oscilloscope, and stored for future post-processing. In block 825, an integer i is set to one. In block 830, a signal comprising a noise signal is transmitted for the ith noise setting. A piece of communications equipment employing a transmitter, such as transmitter 100, 200, 300, or 400, may have N noise settings to be able to test N values of SNR, where N is an integer greater than 1. The signal transmitted in block 830 may also comprise a data signal, such as the data signal transmitted in block 810. Alternatively, the signal transmitted in block 830 may not comprise any signal other than a noise signal. Next in block 840, the transmitted noise signal is captured, for example, by an oscilloscope, and stored for future post-processing. In block 850, a decision is made whether i is equal to N. If not, i is incremented in step 855 and steps 830 and 840 are repeated as shown in the flowchart 800. If i=N, a noise signal has been transmitted at all N noise settings, and the flowchart proceeds to block 860. In block 860, stored results for the transmitted data signal and the transmitted signals for various noise settings are processed to determine SNR for the N noise settings. Note that blocks may be performed in various orders according to different embodiments. If the transmitted signal for various noise settings includes a data signal, the power of the data signal may be accounted for by subtracting the power of the data signal from the transmitted signal in computing SNR. For example, blocks 810 and 820 may be performed after the loop involving blocks 825, 830, 840, 850, and 855. The process in flowchart 800 may be utilized together with the transmitters presented herein to effectively run noise margin tests in high-speed data communication equipment with data rates in excess of 1 Gbps.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term "about" means +/-10% of the subsequent number, unless otherwise stated. Use of the term "optionally" with respect to any element of a claim means that the element is required, or alternatively, the element is not required, both alternatives being within the scope of the claim. As used herein, the term "based on" followed by a parameter or an activity means partially or non-exclusively based on the parameter or the activity, respectively, unless otherwise specified. For example, if a first quantity is described as being "based on" a second quantity, the first quantity may not be limited to being solely or exclusively based on the second quantity, unless otherwise specified. That is, the first quantity may also be based on other unnamed factors or quantities. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A transmitter comprising:
    a noise signal generator configured to receive multiple noise settings and output multiple noise signals corresponding to the multiple noise settings; and
    a summing element configured to receive a transmit data signal and the multiple noise signals, sum one or more of the multiple noise signals with the transmit data signal, and output a sum signal,
    wherein the noise signal generator comprises a pseudo-random binary sequence (PRBS) generator with an adjustable phase,
    wherein output of the noise signal generator and the transmit data signal are discrete-time symbols summed by the summing element, which is a digital summing element, and wherein the transmitter further comprises:
    a gain element configured to adjust an amplitude of the sum signal;
    a finite impulse response (FIR) filter configured to filter the transmit data signal; and
    an analog summing element configured to generate a second sum signal as a sum of at least one output from the FIR filter and the output of the gain element, wherein the transmit driver is configured to receive the second sum signal.

2. The transmitter of claim 1, wherein the transmit driver is further configured to transmit an output signal to a transmission channel at a data rate higher than one gigabits per second (Gbps), and wherein the multiple noise signals of the noise signal generator are injected in the transmitter without an impact on the transmission channel.

3. The transmitter of claim 1, wherein the multiple noise signals are injected internally inside the transmitter without impacting a communication channel coupled to the transmit driver, and wherein the multiple noise settings comprise multiple amplitude and phase control settings.

4. A transmitter comprising:
    a noise signal generator;
    a summing element configured to generate a signal as a sum of an output of the noise signal generator and a transmit data signal; and
    a transmit driver configured to generate an output signal based on the sum,
    wherein the noise signal generator comprises:
        a noise source; and
        a gain and phase control element coupled to the noise source,
        wherein the gain and phase control element has an adjustable gain controlled by a control signal, and
        wherein the noise source is a pseudo-random binary sequence (PRBS) generator with an adjustable phase,
    wherein the output of the noise signal generator and the transmit data signal are discrete-time symbols summed by the summing element, which is a digital summing element, and
    wherein the transmitter further comprises:
        a gain element configured to adjust an amplitude of the sum signal;
        a finite impulse response (FIR) filter configured to filter the transmit data signal; and
        an analog summing element configured to generate a second sum signal as a sum of at least one output from the FIR filter and the output of the gain element, wherein the transmit driver is configured to receive the second sum signal,
    wherein the FIR filter and the PRBS generator are clocked with the same clock signal, and
    wherein the FIR filter comprises at least one delay element configured to delay the transmit data signal by one clock cycle.

* * * * *